United States Patent
Cullis-Hill

(10) Patent No.: US 12,521,409 B2
(45) Date of Patent: Jan. 13, 2026

(54) COGNITION

(71) Applicant: Sydney David Cullis-Hill, Sydney (AU)

(72) Inventor: Sydney David Cullis-Hill, Sydney (AU)

( * ) Notice: Subject to any disclaimer, the term of this patent is extended or adjusted under 35 U.S.C. 154(b) by 0 days.

(21) Appl. No.: 18/814,957

(22) Filed: Aug. 26, 2024

(65) Prior Publication Data

US 2025/0032521 A1   Jan. 30, 2025

Related U.S. Application Data

(63) Continuation of application No. PCT/AU2024/050753, filed on Jul. 12, 2024.

(30) Foreign Application Priority Data

Jul. 14, 2023 (AU) .................. 2023902258

(51) Int. Cl.
*A61K 31/7008* (2006.01)
*A61P 25/28* (2006.01)

(52) U.S. Cl.
CPC .......... *A61K 31/7008* (2013.01); *A61P 25/28* (2018.01)

(58) Field of Classification Search
CPC ............................ A61K 31/7008; A61P 25/28
See application file for complete search history.

(56) References Cited

FOREIGN PATENT DOCUMENTS

| | | |
|---|---|---|
| CN | 109771432 A | 5/2019 |
| CN | 113244248 A | 8/2021 |
| WO | WO-03/094842 A2 | 11/2003 |
| WO | WO-2012/160337 A1 | 11/2012 |
| WO | WO-2016025790 A1 * | 2/2016 ............. A61K 31/35 |

OTHER PUBLICATIONS

Lee, S-U et al. Plos One. 2019, 14(3): e0214253. (Year: 2019).*
Asadollahi, M., et al. American Journal of Alzheimer's Disease & Other Dementias. 2019, vol. 34(2) 81-88. (Year: 2019).*
Zheng et al. "Association of regular glucosamine use with incident dementia: evidence from a longitudinal cohort and Mendelian randomization study," BMC Medicine. 21(114): 1-13 (Mar. 2023).
International-Type Search Report for Australian Patent Application No. 2023902258, dated Mar. 6, 2024 (19 pages).
Akella et al., "Fueling the fire: emerging role of the hexosamine biosynthetic pathway in cancer," BMC Biology. 17(52). Jul. 2019. (14 pages).
Shikhman et al., "Differential metabolic effects of glucosamine and N-acetylglucosamine in human articular chondrocytes," Author Manuscript; published in final edited form as: Osteoarthritis Cartilage. 17(8): 1022-1028. Aug. 2009. (19 pages).
Sun et al., "Brain glycogen serves as a critical glucosamine cache required for protein glycosylation," Author Manuscript; published in final edited form as: Cell Metab. 33(7): 1404-1417. Jul. 2021. (40 pages).
Zhang et al., "Synthesis and anti-inflammatory activities of two new N-acetyl glucosamine derivatives," Scientific Reports. 14: 11079. May 2024. (10 pages).

* cited by examiner

*Primary Examiner* — Eric Olson
*Assistant Examiner* — Samuel L Galster
(74) *Attorney, Agent, or Firm* — Clark & Elbing LLP

(57) ABSTRACT

The present invention relates to acetyl glucosamine. In particular, the present invention relates to the use of acetyl glucosamine to improve cognition.

15 Claims, No Drawings

COGNITION

FIELD OF THE DISCLOSURE

The present invention relates to acetyl glucosamine. In particular, the present invention relates to the use of acetyl glucosamine to improve cognition. However, it will be appreciated that the invention is not limited to this particular field of use.

RELATED APPLICATIONS

This application claims priority from Australian provisional application 2023902258 (filed 14 Jul. 2023), the contents of which are hereby incorporated by reference in their entirety.

BACKGROUND OF THE DISCLOSURE

Cognitive disorders, or impairments of memory and learning processes, have a significant detrimental effect on the quality of life-both of the individual suffering from the disorder, and for individuals caring for them. Clinically recognized cognitive disorders vary from mild cognitive impairment through to dementia of varying severity. Cognitive disorders may also be associated with several diseases or disorders such as schizophrenia, depression or Parkinson's disease.

Dementia is a clinically recognized broad-spectrum syndrome entailing progressive loss of cognitive capabilities. Dementia can be one of many symptoms of various neurological diseases or the main abnormality associated with the disease, as it is the case in Alzheimer's disease (AD). Common causes of dementia include cerebral atrophy associated with AD, Lewy body disease (or Lewy body dementia), frontotemporal lobe disorders, Pick's disease, vascular narrowing or blockage in the brain (i.e. vascular dementia, also known as multi-infarct dementia), Huntington's disease, Parkinson's disease, head trauma, HIV infection or Down syndrome.

AD is the most common cause of dementia in older people. AD, is a chronic neurodegenerative disease and was previously understood as a variant of senile dementia disease. AD affects the parts of the brain involved in thought, memory and language. As such, the most common early symptom is often difficulty in remembering recent events (short-term memory loss). As the disease advances, AD may present as symptoms that include problems with language, disorientation (including easily getting lost), mood swings, loss of motivation, reduced self-care, and behavioural issues. Mild cognitive impairment (MCI) is believed to be a transition stage between the cognitive changes of normal aging and the more serious problems caused by AD. Patients with MCI have symptoms that are not as severe as patients with AD, and usually are self-sufficient and able to carry out normal daily activities.

It is estimated that currently 4 million people in the US may have AD. The symptoms of AD appear typically between the ages of 65 to 90 years. Although the risk of AD increases with age, AD is not a part of the normal aging process. While younger people may have AD, it is much less common. About 3% of men and women aged 65 to 74 years have AD and nearly half of those over the age of 85 years could have the disease.

At present, the cause(s) of AD are controversial, and multiple mechanisms for disease pathology have been proposed. However, one of the hallmarks of AD is the accumulation of amyloid plaques in the brain. The amyloid plaques are extracellular deposits of aggregates formed by amyloid beta (AB) peptides. A further characteristic of AD is the presence of neurofibrillary tangles, which are intracellular aggregates of hyperphosphorylated tubulin associated unit protein (Tau). These amyloid plaques and neurofibrillary tangles have come to be recognised as histopathological hallmarks of AD.

There is no cure for AD and related dementias. Moreover, currently there are only a few medications that have been shown to afford at best a modest, mostly transient, benefit to the patients suffering from cognitive impairment. These drugs not only have limited efficacy, but also considerable side effects and high costs which in some cases lead to discontinuation of the therapy. With the increase in the average lifespan and general aging of the population, there is a need to develop treatments that delay or alleviate the decline in cognitive function in aging patients, or that improve cognitive function in individuals with AD or related dementias.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE DISCLOSURE

It has been surprisingly found by the inventors that cognitive disorders can be treated by administration of acetyl glucosamine.

According to a first aspect, the present invention provides a method of treating a cognitive disorder in a subject, comprising administering to the subject acetyl glucosamine. The present invention also provides a method of treating a preclinical cognitive condition in a subject, comprising administering to the subject acetyl glucosamine. Optionally, the subject is identified as at risk of a cognitive disorder. The present invention further provides a method of preventing a cognitive disorder or a preclinical cognitive condition in a subject, comprising administering to the subject acetyl glucosamine. Optionally, the subject is identified as at risk of a cognitive disorder or a preclinical cognitive condition.

According to a second aspect, the present invention provides use of acetyl glucosamine for the manufacture of a medicament for treating a cognitive disorder in a subject. The present invention also provides use of acetyl glucosamine for the manufacture of a medicament for treating a preclinical cognitive condition in a subject. Optionally, the subject is identified as at risk of a cognitive disorder. The present invention further provides use of acetyl glucosamine for the manufacture of a medicament for preventing a cognitive disorder or a preclinical cognitive condition in a subject. Optionally, the subject is identified as at risk of a cognitive disorder or a preclinical cognitive condition.

According to a third aspect, the present invention provides a composition comprising acetyl glucosamine for use in treating a cognitive disorder in a subject. The present invention provides a composition comprising acetyl glucosamine for use in treating a cognitive disorder in a subject.

In one embodiment the acetyl glucosamine has the following structure

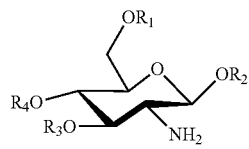

wherein at least one of $R_1$, $R_2$, $R_3$ and $R_4$ is acetyl and the rest are independently H or acetyl,
or a pharmaceutically-acceptable salt thereof.

In one embodiment, $R_1$, $R_2$, $R_3$ and $R_4$ are all acetyl. In one embodiment, two of $R_1$, $R_2$, $R_3$ and $R_4$ are acetyl. In one embodiment, three of $R_1$, $R_2$, $R_3$ and $R_4$ are acetyl. Combinations of acetyl glucosamines of and are also contemplated. Optionally, one, two, three or four of $R_1$, $R_2$, $R_3$ and $R_4$ are all acetyl.

In one embodiment, the acetyl glucosamine is administered to the subject by a route selected from orally, nasally, buccally, sublingually, intravenously, transmucosally, parenterally, by inhalation, spray, transdermally, subcutaneously, intrathecally, topically and rectally.

In one embodiment, the acetyl glucosamine is administered to the subject orally. Optionally, the oral administration is of a composition comprising the acetyl glucosamine and one or more pharmaceutically acceptable excipients. Preferably, the composition is solid, and more preferably in the form of a tablet, capsule, or powder. The pharmaceutically acceptable excipient is optionally, fillers, solid carriers, coatings, diluent, lubricant, binders, taste maskers, preservatives, antibacterial and antifungal agents, isotonic and absorption delaying agents, any physiological buffered (i.e., about pH 7.0 to 7.4) medium including a suitable water soluble carrier, conventional solvents, dispersion media. Other conventional additives include lactose, mannitol, corn starch, potato starch, binders such as crystalline cellulose, cellulose derivatives, acacia, gelatins, disintegrators such as sodium carboxymethyl-cellulose, and lubricants such as talc or magnesium stearate.

In one embodiment, the acetyl glucosamine decreases expression of exostosin glycosyltransferase 1 (EXT1) in the brain of the subject.

In one embodiment, the acetyl glucosamine decreases expression of UDP N-acetyl glucosamine expression in the brain of the subject.

In one embodiment, the acetyl glucosamine reduces levels of highly sulfated heparan sulfate in the brain of the subject.

In one embodiment, the cognitive disorder is Alzheimer's disease (AD).

In one embodiment, the AD is early-onset AD.

In one embodiment, the AD is late-onset AD.

In one embodiment, the AD is the Uppsala APP deletion form of AD.

In one embodiment, the acetyl glucosamine increases levels of glucosamine 6 phosphate and glucose 6 phosphate in the brain of the subject. Preferably, the acetyl glucosamine increases levels of glucosamine 6 phosphate in the brain of the subject compared to glucosamine 6 phosphate levels in the brain of the subject prior to the administration of the acetyl glucosamine.

In one embodiment, the acetyl glucosamine increases levels of fructose 6 phosphate in the brain of the subject.

In one embodiment, the acetyl glucosamine reduces seizure associated death in the subject. In one embodiment, the acetyl glucosamine reduces the frequency of seizure associated death in a population of subjects.

In one embodiment, the acetyl glucosamine reduces spatial working memory deficit in the subject.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of examples.

DETAILED DESCRIPTION

In describing and claiming the present invention, the following terminology has been used in accordance with the definitions set out below. It is also to be understood that the terminology used herein is for the purpose of describing particular embodiments of the invention only and is not intended to be limiting. Unless defined otherwise, all technical and scientific terms used herein have the same meaning as commonly understood by one having ordinary skill in the art to which the invention pertains.

As used herein the term "about" can mean within 1 or more standard deviation per the practice in the art. Alternatively, "about" can mean a range of up to 20%. When particular values are provided in the specification and claims the meaning of "about" should be assumed to be within an acceptable error range for that particular value.

In the context of the invention the term "subject" includes any human or non-human animal. The term "non-human animal" includes all vertebrates, for example mammals and non-mammals, such as non-human primates, horses, cows, dogs, etc. A population of subjects can be a population of a specific species or a subspecies population, for example, humans with a specific disorder such as AD, early-onset AD, late-onset AD or the Uppsala APP deletion form of AD.

In the context of the present invention, the words "comprise", "comprising" and the like are to be construed in their inclusive, as opposed to their exclusive, sense, that is in the sense of "including, but not limited to".

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

Other than in the operating examples, or where otherwise indicated, all numbers expressing quantities of ingredients or reaction conditions used herein are to be understood as modified in all instances by the term 'about'.

The recitation of a numerical range using endpoints includes all numbers subsumed within that range (e.g., 1 to 5 includes 1, 1.5, 2, 2.75, 3, 3.80, 4, 5, etc.).

As used herein, the term "acetyl glucosamine" means glucosamine wherein one or more of the —OH have been replaced with —OAc (i.e., acetoxy, also shown as $CH_3$—C(=O)—O—). Optionally, the acetyl glucosamine has one acetylation at one of $R_1$, $R_2$, $R_3$ or $R_4$. Optionally, acetyl glucosamine has two acetylations at one of $R_1$ and $R_2$, $R_1$ and $R_3$, $R_1$ and $R_4$, $R_2$ and $R_3$, $R_2$ and $R_4$, or $R_3$ and $R_4$.

Optionally, acetyl glucosamine has three acetylations at one of $R_1$, $R_2$ and $R_3$, $R_2$, $R_3$ and $R_4$, $R_1$, $R_3$ and $R_4$, or $R_1$, $R_2$ and $R_4$.

As used herein the term "tetra-acetyl glucosamine" (TAG) means glucosamine wherein all of the —OH have been substituted with —OAc.

The present invention includes within its scope the salts and isomers of acetyl glucosamine. The term "salt(s)", as employed herein, denotes acidic and/or basic salts formed with inorganic and/or organic acids and bases. Also included herein are quaternary ammonium salts such as alkylammonium salts. Pharmaceutically acceptable (i.e., non-toxic, physiologically acceptable) salts are preferred. Salts of the compounds may be formed, for example, by reacting a compound with an amount of acid or base, such as an equivalent amount, in a medium such as one in which the salt precipitates or in an aqueous medium followed by lyophilization.

Exemplary salts include ammonium salts, alkali metal salts such as sodium, lithium, and potassium salts, alkaline earth metal salts such as calcium and magnesium salts, salts with organic bases (for example, organic amines) such as benzathines, dicyclohexylamines, hydrabamines, N-methyl-D-glucamines, N-methyl-D-glucamides, t-butyl amines, and salts with amino acids such as arginine, lysine and the like.

Solvates of the compounds of the invention are also contemplated herein. Solvates of the acetyl glucosamine are preferably hydrates or other pharmaceutically acceptable solvates.

All stereoisomers of the acetyl glucosamine, such as those which may exist due to asymmetric carbons on the R substituents of the compound, including enantiomeric and diastereomeric forms, are contemplated within the scope of this invention. Individual stereoisomers of the compounds of the invention may, for example, be substantially free of other isomers, or may be admixed, for example, as racemates or with all other, or other selected, stereoisomers. The chiral centres of the present invention may have the S or R configuration.

As used herein, the term "treating" or "treatment" includes reversing, reducing, or arresting the symptoms, clinical signs, and underlying pathology of a condition in manner to improve or stabilize a subject's condition. As used herein, and as well understood in the art, "treatment" is an approach for obtaining beneficial or desired results, including clinical results. Beneficial or desired clinical results can include, but are not limited to, alleviation or amelioration of one or more symptoms or conditions, diminishment of extent of disease, stabilized (i.e., not worsening) state of disease, preventing spread of disease, delay or slowing of disease progression, amelioration or palliation of the disease state, and remission (whether partial or total), whether detectable or undetectable. "Treatment" can also mean prolonging survival as compared to expected survival if not receiving treatment. Treatment is optionally treatment of a cognitive disorder.

Treatment may also be treatment of a preclinical cognitive condition. For example, treatment of a preclinical condition that is expected to progress to a cognitive disorder. Optionally, the preclinical cognitive condition is mild cognitive impairment. Optionally, a subject with a preclinical condition also has a biomarker for the cognitive disorder that is expected to develop. Optionally, the preclinical cognitive condition is determined in accordance with a screening test for cognitive impairment, suitable tests are set out below, or by functional neuroimaging, suitable imaging is described further below.

As used herein, "preventing" or "prevention" is intended to refer to at least the reduction of likelihood of the risk of (or susceptibility to) acquiring a disease or disorder (i.e., causing at least one of the clinical symptoms of the disease not to develop in a subject that may be exposed to or predisposed to the disease but does not yet experience or display symptoms of the disease). Biological and physiological parameters for identifying such subjects are provided herein and are also well known by physicians. For example, prevention or preventative measures may be adopted for a patient deemed to be at risk, for example, a patient identified as having a dementia or other cognitive or neurodegenerative or other condition described herein.

Optionally, prevention of a cognitive disorder or prevention of a preclinical cognitive condition occurs in a subject identified as at risk of developing a cognitive disorder or a preclinical cognitive condition. Optionally, the subject at risk of developing the cognitive disorder is a subject with a preclinical cognitive condition. Optionally, the subject at risk of developing a cognitive disorder or a preclinical cognitive condition has one or more of (i) a familial history of the cognitive disorder and/or a genetic risk factor for a cognitive disorder; (ii) a biomarker for the cognitive disorder. Optionally, the subject at risk of developing a cognitive disorder has no symptoms of a cognitive disorder. Genetic risk factors for cognitive disorders such as AD are known in the art. Additional, genetic risk factors are expected to be identified over time and treatment/prevention for subjects with such genetic risk factors is contemplated. Similarly, biomarkers for cognitive such as AD are known in the art. Additional, genetic risk factors are expected to be identified over time and treatment/prevention for subjects with such biomarkers is contemplated.

Compounds of the present invention may be used in a pharmaceutical composition, e.g., combined with a pharmaceutically acceptable carrier, for administration to a patient. Such a composition may also contain diluents, fillers, salts, buffers, stabilizers, solubilizers, and other materials well known in the art. The term "pharmaceutically acceptable" means a non-toxic material that does not interfere with the effectiveness of the biological activity of the active ingredient(s). The characteristics of the carrier will depend on the route of administration. Such additional factors and/or agents may be included in the pharmaceutical composition to produce a synergistic effect with compounds of the invention, or to minimize side effects caused by the compound of the invention. The pharmaceutical composition is optionally a solid, preferably in the form of a tablet, capsule, or powder. Preparation of these dosage forms is known in the art.

The pharmaceutical compositions of the invention may be in the form of a liposome or micelles in which compounds of the present invention are combined, in addition to other pharmaceutically acceptable carriers, with amphipathic agents such as lipids which exist in aggregated form as micelles, insoluble monolayers, liquid crystals, or lamellar layers in aqueous solution. Suitable lipids for liposomal formulation include, without limitation, monoglycerides, diglycerides, sulfatides, lysolecithin, phospholipids, saponin, bile acids, and the like. Preparation of such liposomal formulations is within the level of skill in the art, as disclosed, for example, in U.S. Pat. Nos. 4,235,871; 4,501,728; 4,837,028; and 4,737,323, all of which are incorporated herein by reference. These pharmaceutical compositions are optionally liquid.

The composition may be administered in a variety of ways including orally, nasally, buccally, sublingually, intravenously, transmucosally, parenterally, by inhalation, spray, transdermally, subcutaneously, intrathecally, topically or rectally and may be formulated according to methods known in the art.

The effective dosage of acetyl glucosamine in mouse models is expected to be about 1000 to about 2000 mg/kg active compound/body weight, which may be administered as a single dose or in the form of individual doses, such as from 1 to 4 times a day. Human equivalent Doses (HED) may be extrapolated using accepted methods (Nair & Jacob 2016, *J Basic Clin Pharm;* 7 (2): 27-31; Regan-Shaw et al. 2007, FASEB J 22:659-662).

As used herein, the term "cognitive disease" refers to a condition characterized by a decline or impairment in cognitive functioning. Cognitive functions encompass various mental processes, including memory, attention, language, perception, problem-solving, and decision-making. Cognitive diseases can manifest in different ways and have various underlying causes. Some common cognitive diseases include AD, vascular dementia, Parkinson's disease dementia, Lewy body dementia, frontotemporal dementia, and mild cognitive impairment (MCI). These conditions can affect individuals of different ages, although they are more prevalent in older adults. The symptoms of cognitive diseases may include memory loss, difficulty with language and communication, challenges in reasoning and problem-solving, impaired judgment, personality changes, and difficulties with daily tasks.

As used herein, the term "Alzheimer's disease" (AD) is a progressive neurodegenerative disorder characterized by cognitive decline, memory loss, and behavioural changes. It is characterized by the accumulation of abnormal protein structures in the brain, such as beta-amyloid plaques and tau tangles. Early-onset AD refers to a specific form of AD that manifests before the age of 65 and accounts for approximately 5 to 10 percent of all AD cases. Late-onset AD refers to the most common form of AD, typically occurring after the age of 65. It accounts for about 90 to 95 percent of all diagnoses. The Uppsala APP deletion form of AD, also known as the "Swedish mutation" refers to an autosomal dominant deletion (A690-695) that causes AD. Affected individuals have early-onset of disease, experience symptoms in their early forties, and experience rapid disease progression.

As used herein, a subject with "a familial history of the cognitive disorder" may include an individual with at least one mutation in at least one gene that is known to be associated with or causative of AD. AD is a heterogenous disease, and mutations in a number of genes are known to be associated with AD that have autosomal dominant inheritance. For example, a mutation in the gene encoding amyloid precursor protein (APP), presenilin (PSEN1), and/or presenilin 2 (PSEN2). A number of such variants have been identified, and regions of these proteins where a mutation is likely to be causative of AD or are likely to be benign are well-known in the art (Xiao et al. 2021, *Front Aging Neurosci.*, 13:695808). However, the skilled person will understand that specific mutations that have yet to be characterised, and are likely to have similar effects to mutations that were previously described, are likely to be characterised in the future and may also be present in an individual with a familial history of AD. Variants that are well-known to be causative of AD include the Uppsala APP deletion form of AD.

As used herein, a subject with "a genetic risk factor for AD" may include an individual with a variant of a protein that is associated with an increased risk of developing AD. For example, individuals with the ApoE4 allele of apolipoprotein E have a 10-15 fold increased risk of developing AD relative to individuals with the most common ApoE3 allele.

As used herein, a subject with "a biomarker for the cognitive disorder" may include an individual with a change in at least one of: a score from a psyochometric screening test, a biomarker in blood and/or cerebral spinal fluid, and/or in a measure obtained by cerebral imaging, that is associated with AD. Biomarkers associated with AD are well-known in the art, and are discussed in further detail at to [0066]. A biomarker may be used alone or in combination. For example, an assay to measure plasma Aβ42/40 ratio may be used in combination with PET imaging (Brand et al. 2022, *Alzheimers Res Ther.*, 14 (1): 195). However, it will be understood by the skilled person that further methods may be developed and used to identify individuals who are at risk of AD.

As used herein, the terms "decreased expression", "decreased levels" and the like, refers to a reduction or lower level of activity or production of a particular gene, protein, molecule, or biological component compared to a normal or reference state.

As used herein, the terms "increased expression", "increased levels" and the like, refers to an increase or higher level of activity or production of a particular gene, protein, molecule, or biological component compared to a normal or reference state.

As used herein, the term "seizure-associated death" refers to the situation where a subject dies as a result of a seizure or its complications. Seizures are abnormal and excessive electrical activities in the brain that can cause various physical and behavioural manifestations.

As used herein, the term "Spatial working memory" refers to the cognitive ability and temporary storage system that allows subjects to hold and manipulate spatial information in their mind over short periods of time. It involves the mental representation, manipulation, and updating of spatial relationships and locations. Spatial working memory is crucial for a variety of cognitive processes and daily activities that require navigation, orientation, and spatial reasoning. It allows individuals to remember and mentally manipulate spatial information, such as the locations of objects, the layout of a physical environment, or the path to a destination.

A subject's spatial working memory can be measured by one or more of the following techniques that are used to determine whether a subject has a cognitive disorder, has a preclinical cognitive condition or is healthy.

In some embodiments, treatment of the cognitive disorder may refer to a reduction of score on the scale or subscale of the Neuropsychiatric Inventory-Nursing Home Version (NPI-NH) or the Alzheimer's Disease Cooperative Study-Clinical Global Impression of Change (ADSC-CGIC). For example, an improvement refers to a reduction of a patient's total NPI-NH score from a score of 50 to a score of 40. In some embodiments, the improvement may optionally refer to one or more patients.

In some embodiments, treatment of the cognitive disorder may refer to improvement in the score of a psychometric screening test. Prevention of a cognitive disorder may refer to maintaining or improving a subject's healthy or preclinical cognitive condition score and/or preventing progression to a cognitive disorder score (particularly when such progress is expected). Screening tests for cognitive impairment may include 3 MS, CASI, MMSE, SASSI, STMS, CAST, GPCOG, 7 MS, AMT, Mini-Cog, SIS, T&C, ACE-R, or DemTect, self-administered tools such as p-AD8+IQCODE, and/or combinations of tests, such as DemTect and MoCA, or MES and MoCA. For example, an improvement may be an improvement in the raw scores for the word list section of a DemTect test from 6 to 9. In some embodiments, the improvement may optionally refer to one or more patients, or one or more tests, or a result for a population. These tests can also be used to identify if a subject is healthy, preclinical condition, or has a cognitive disorder prior to administration of the acetyl glucosamine.

In some embodiments, treatment of the cognitive disorder may refer to improvement in cerebral blood flow and/or cerebral metabolism, and/or stopping progress of or reversing clinical cortical atrophy as detected by functional neuroimaging. Preventing the cognitive disorder may refer to improvement in healthy or preclinical levels in cerebral blood flow and/or cerebral metabolism, and/or stopping or reversing cortical atrophy at healthy or preclinical levels or preventing progress to cognitive disorder levels of cortical atrophy (particularly when such progress is expected). Such imaging includes positron emission tomograph (PET), fludeoxyglucose (FDG)-PET, $^{99m}$Tc-hexamethyl propylene amine oxime (HMPAO) single-photon emission computed tomography (SPECT) and/or magnetic resonance imaging (MRI), or combinations thereof, such as early-frame Florabetaben PET/MRI. For example, an improvement may be an improvement in the amount of cerebral blood flow in specific regions of the brain as visualised using the imaging methods. In some embodiments, the improvement may optionally refer to improvement in one or more patients, and/or improvement in one or more methods of imaging.

In some embodiments, treatment of the cognitive disorder may refer to stopping the progress of or reversing clinical changes in levels of biomarkers in cerebrospinal fluid (CSF). Prevention of the cognitive disorder may refer to improvements in healthy or preclinical levels of biomarkers and/or stopping progress of or reversing changes in preclinical levels or biomarkers (or biomarkers in a patient that is preclinical on a screening or other test) or preventing progress to clinical levels or biomarkers (or preventing progress to a clinical result on a screen or other test in a subject with relevant biomarkers). Aβ42, tau, tau-p181, tau-p231, tau/Aβ42 ratio and the synaptic protein NPTX2 are examples of CSF biomarkers of MCI, pre-clinical AD and AD. A reversal of the change in level of a biomarker in CSF may be an increase in the levels of NPTX2, which increases the amount of time to MCI symptom onset. In some embodiments, the improvement may optionally refer to one or more patients, or one or more biomarkers.

In some embodiments, treatment of the cognitive disorder may refer to stopping the progress of or reversing clinical changes in levels of biomarkers in blood. Prevention of the cognitive disorder may refer to improvements in healthy or preclinical levels of biomarkers and/or stopping progress of or reversing changes in preclinical levels or biomarkers (or biomarkers in a patient that is preclinical on a screening or other test) or preventing progress to clinical levels or biomarkers (or preventing progress to a clinical result on a screen or other test in a subject with relevant biomarkers). T-tau, tau-p181, NfL, AβPPr, Aβ42, Aβ42/Aβ40 ratio, and tau-p217 are examples of blood biomarkers for MCI, AD, and progression of AD. A reversal of the change in level of a biomarker in blood may be a decrease in the levels of NfL, which increases the amount of time to MCI symptom onset. In some embodiments, the improvement may optionally refer to one or more patients, or one or more biomarkers.

Treatment as used herein with respect to the clinical setting may refer to a clinically relevant (desirable) effect being achieved greater than about 5%, 10%, 20%, 30%, 40%, 50%, 60%, 70%, 80%, 90%, 100%, 110%, 120%, 130%, 140%, 150%, 160%, 170%, 180%, 200%, 300%, 400%, or 500% when compared to baseline after a specified period of time. In some embodiments, the treatment refers to improved efficacious effect in a single patient as compared to baseline (i.e., prior to the administration). In other embodiments, the treatment refers to the demonstration of efficacy by a greater percentage of patients demonstrating an efficacious effect after a specified period of time as compared to placebo or lack of treatment. In various embodiments, the percentage of patients demonstrating an efficacious effect is increased by greater than about 5%, 10%, 20%, 30%, 40%, 50%, 60%, 70%, 80%, 90%, 100%, 110%, 120%, 130%, 140%, 150%, 160%, 170%, 180%, 200%, 300%, 400%, or 500% when compared to placebo or lack of treatment. In some embodiments, the specified period of time is about two weeks, four weeks or six weeks. In one embodiment, the specified period of time is six weeks.

Treatment as used herein with respect to the clinical setting may refer to a clinically relevant (undesirable) effect being achieved less than about 5%, 10%, 20%, 30%, 40%, 50%, 60%, 70%, 80%, 90%, 100%, 110%, 120%, 130%, 140%, 150%, 160%, 170%, 180%, 200%, 300%, 400%, or 500% when compared to baseline after a specified period of time or when compared to placebo or lack of treatment. In some embodiments, the specified period of time is about two weeks, four weeks or six weeks. In one embodiment, the specified period of time is six weeks.

It will be understood that the invention disclosed and defined in this specification extends to all alternative combinations of two or more of the individual features mentioned or evident from the text. All of these different combinations constitute various alternative aspects of the invention. For purposes of interpreting this specification, terms used in the singular will also include the plural and vice versa.

Reference will now be made in detail to certain embodiments of the invention. While the invention will be described in conjunction with the embodiments, it will be understood that the intention is not to limit the invention to those embodiments. On the contrary, the invention is intended to cover all alternatives, modifications, and equivalents, which may be included within the scope of the present invention as defined by the claims.

One skilled in the art will recognize many methods and materials similar or equivalent to those described herein, which could be used in the practice of the present invention. The present invention is in no way limited to the methods and materials described. It will be understood that the invention disclosed and defined in this specification extends to all alternative combinations of two or more of the individual features mentioned or evident from the text or drawings. All of these different combinations constitute various alternative aspects of the invention.

All of the publications referred to herein are incorporated by reference in their entirety.

Although the invention has been described with reference to certain embodiments detailed herein, other embodiments can achieve the same or similar results. Variations and modifications of the invention will be obvious to those skilled in the art and the invention is intended to cover all such modifications and equivalents.

The inventors expected that expression of exostosin glycosyltransferase 1 (EXT1) and UDP N-acetyl glucosamine would be downregulated in the brains of mice fed acetyl glucosamine. Both EXT1 and UDP N-acetyl glucosamine are required for synthesis of heparan sulfate, which is converted to a highly sulfated form in AD brains (Wang et al. 2022, *Anal Chem.* 94 (6): 2950-2957; Perez-Lopez et al. 2021, *J Neuropathol Exp Neurol.* 80 (5): 446-456; Roberts 2017 et al. *J Alzheimers Dis Rep.* 1 (1): 115-124). During biosynthesis of heparan sulfate, the polymer chain undergoes a series of enzymatic modifications, including a wide variety of O-sulfations of the saccharide chain. Highly sulfated heparan sulfate can include heparan sulfate that has an above-average level of sulfation. Optionally, highly sulfated heparan sulfate has an increased level of 3-O or 6-O sulfation in heparan sulfate (Wang et al. 2023, *Sci Adv.*, 9 (21): eadf6232; Rauch et al. 2018, *Sci Rep.*, 8 (1): 6382), and/or an increase in the number of sulfations in specific subdomains of heparan sulfate, such that they comprise consecutive clusters of sulfated disaccharides and/or trisulfated disaccharide (for example, -iduronic acid (2S)-Glucosamine (NS,6S)—) structures. The levels of highly sulfated heparan sulfate may be measured in biopsy tissue by a number of methods, including histochemical techniques (Snow et al. 2021, *Front Aging Neurosci.*, 13:710683) and by assay of heparan sulfate disaccharide composition and ratios (Karamanos et al. 1997, *J Chromatogr A.*, 765 (2): 169-79). Antibodies that recogise highly sulfated heparan sulfate are also known in the art, and include antibodies such as the RB4CD12 antibody (Hosono-Fukao et al. 2012, *Am J Pathol.*, 180 (5): 2056-67). Methods for measurement of EXT1 expression in biopsy tissue are also know in the art, and may be measured using commercial ELISA kits and/or by quantitative PCR. Methods for measurement of UDP-N-acetyl glucosamine are well-known in the art, and include enzyme-based assays (Sunden et al, 2023, *Cell Rep Methods*, 3 (7): 100518).

It has been found by the inventors that plasma glutamate levels are reduced, the ratio of glutamine/glutamate in plasma is increased, and UDP N-acetyl glucosamine in brain tissue is increased in mice models of AD that were fed a diet supplemented with TAG.

The inventors expected that seizure-associated death and memory deficit are reduced in mice models of Alzheimer's disease fed acetyl glucosamine.

It has been found by the inventors that memory deficits are reduced in mice models of AD that were fed a diet supplemented with TAG.

In another embodiment there is provided a kit or article of manufacture including one or more acetyl glucosamine for use according to the invention in any method as described above.

In other embodiments there is provided a kit for use in a therapeutic or prophylactic application mentioned above, the kit including:
  a container holding an acetyl glucosamine pharmaceutical composition of the invention;
  a label or package insert with instructions for use.

The kit or "article of manufacture" may comprise a container and a label or package insert on or associated with the container. Suitable containers include, for example, bottles, vials, syringes, blister pack, etc. The containers may be formed from a variety of materials such as glass or plastic. The container holds a therapeutic composition which is effective for treating the cognitive disease. The label or package insert indicates that the therapeutic composition is used for treating the cognitive disease of choice. In one embodiment, the label or package insert includes instructions for use and indicates that the therapeutic or prophylactic composition can be used to treat an cognitive disease described herein.

The present invention is further described by the following non-limiting examples.

EXAMPLES

Example 1A—Exostosin Glycosyltransferase 1 Expression in Brains of Mice Fed Tetra-Acetyl Glucosamine (TAG)

Exostosin glycosyltransferase 1 (EXT1) is transmembrane glycosyltransferase involved in the chain elongation step of heparan sulfate biosynthesis. It catalyses the glycosidic addition of N-acetyl glucosamine and glucuronic acid to the HS chain (from UDP N-acetyl glucosamine).

Wild type mice will be maintained on TAG-supplemented diet or control diet and then sacrificed by nitrogen gas asphyxiation. Brains excised by craniotomy will be bisected in the sagittal plane and one hemi-brain from each mouse frozen and stored at −80° C. Brain tissue will be thawed, weighed and then total RNA extracted using a QIAGEN extraction kit with DNAse treatment. RNA will be quantified by absorbance at 260 nm, then cDNA prepared by reverse transcription of equal amounts (585 ng) of purified DNA, followed by amplification with random hexamers. QPCR for EXT1 will be carried out using primers and fluorescent probe (Fluorescein Amidite) from IDT DNA. QPCR of 2 house-keeping genes will be run in the same reaction using probes containing different fluorophores: Hexachlorofluorescein probe for Ribosomal Protein LPO QPCR and Cyanine 5 probe for Beta 2 macroglobulin QPCR.

EXT1 levels will be compared by the ddct method (Livak & Schmittgen 2001, *Methods* 25 (4): 402-408.) ddcT values will be compared by one-tailed T-tests.

It is anticipated that mice fed TAG will have reduced EXT1 expression using B2M housekeeping standard.

Example 1B—TAG Reduces Plasma Glutamate Levels and Increases the Ratio of Glutamine/Glutamate in Plasma of AD Mice In healthy brain the neurotransmitter L-glutamate is actively absorbed from the neural synapse by astrocytes and then converted to glutamine by the enzyme glutamine synthase (GS). Impaired glutamine/glutamate recycling produces excessive glutamate which is excitotoxic to neuronal cells. Excitotoxic leak of calcium ions in AD mice can be attributed to glutamate binding to defective Gria2 AMPA2 receptors. Several lines of research implicate impaired glutamine/glutamate metabolism in AD aetiology including reduced activity of the glutamate transporter and of glutamine synthase. A meta-analysis of clinical AD data, in vitro modelling, and animal modelling suggest that circulating glutamine has a protective effect against AD.

Genetically modified mice have been used to study the role of genes in AD for over 20 years. Of these the most widely used is the TG2576 APPswe mouse (G2576) which expresses the APP695 variant of human amyloid precursor protein (h-APP) under the hamster prion protein (prp) promoter (Hsiao et al. 1996, *Science* 274 (5284): 99-102). APP695 carries the double mutation K670N-M671L and is cleaved in vivo to the amyloidogenic amyloid 1-42 peptide (Aβ1-42). Hemizygous TG2576 mice develop Alzheimer's-like pathology including amyloid neuropathology and cognitive deficits affecting spatial learning and working memory (Hsiao et al. 1996, *Science* 274 (5284): 99-102).

TG2576 mice were bred and housed in a dedicated, PC2-licensed animal house with a light-dark cycle of 12:12 h. Mice were maintained ad libitum on standard mouse chow and potable water. The TG2576 strain was maintained on a B6/SJL background. Mice were genotyped by PCR of genomic DNA from skin samples. Housing and care of animals was in compliance with NSW DPI ARRP guidelines.

Powdered rat and mouse pellets (Specialty Feeds, Canningvale, WA) were blended manually with TAG at 0.84% (w/w). Sterile deionized water was then blended with the mixture at 10% w/w. The mash was milled through a pellet press and the pellets baked for 2.5 h at 75° C., then stored dry at −20° C. prior to use.

TG2576 mice were fed either a TAG-supplemented diet or control chow for 6 weeks. Following euthanasia, core blood was sampled by venipuncture of the cardiac ventricle. Plasma was prepared by centrifugation of whole blood. Plasma was diluted 1:20 with water, then purified of high molecular weight contaminants (>1 kDa) by passing through a molecular weight filter. A 20 µl sample was analysed by LC-MS using a HPLC column (Phenomenex, Luna phenyl-hexyl 5 µm, 250 mm×4.6 mm id) with a 1 mL/min gradient of 1 mM ammonium formate (pH 4.3) isocratic for 4 min then linear gradient over 2 minutes to 45% acetonitrile containing 1 mM ammonium formate (pH 4.3), maintained for 2 min. The Thermo LTQXL MS was run in positive ion mode, scanning for parent ion of m/z 147 ($M^+H$).

Glutamine was identified by retention time 2.7 min and presence of daughter fragment m/z 130 ($M^+H-NH_3$). Glutamate was detected using the same LC column running 1 mL 90% acetonitrile with 0.1% formic acid isocratic for 1 min, then linear gradient over 4 min to 5% MeCN, 5% MeOH, 0.1% formic acid, maintained for 1.5 min. The Thermo LTQXL MS was run in positive ion mode, scanning for parent ion of m/z 148 ($M^+H$). Glutamine was identified by retention time 2.1 min and presence of daughter fragment m/z 130 ($M^+H-H_2O$). Glutamine/glutamate concentrations were calculated by regression analysis of sample peak integrals against those of a standard curve prepared using commercially sourced standards. Control and TAG-supplemented diet after 43 weeks of supplementation (age 51.8±1.5 wk at plasma sampling) were compared by 1-tailed t-test in Table 1.

TABLE 1

Changes in plasma concentration of glutamate, concentration of glutamine, and ratio of glutamine to glutamate after TAG supplementation

|  | Control diet (n = 6) | TAG diet (n = 6) | t-test (p-value) |
|---|---|---|---|
| Glutamate | 1.25 ± 0.047 | 1.05 ± 0.094 | 0.046 |
| Glutamine | 5.56 ± 0.81 | 6.77 ± 1.05 | 0.19 |
| Ratio of: [Glutamine]/ [Glutamate] | 4.40 ± 0.55 | 6.44 ± 1.47 | 0.043 |

Table 1 shows the effect of a diet supplemented with TAG for 6 weeks on the concentrations of glutamate, glutamine, and the ratio of glutamine to glutamate in blood plasma of TG2576 mice. Glutamate and glutamine levels are given as RU/ml values (recovered integrator units/ml). Mice on a diet supplemented with TAG had significantly lower levels of glutamate compared to control mice (p=0.046). Mice on a diet supplemented with TAG had a significantly higher ratio of glutamine/glutamate (p=0.043) compared to control mice.

A trend of increased plasma glutamine and a commensurate decrease in glutamate was observed in TG2576 mice on the TAG diet for 43 weeks. This trend of higher levels of plasma glutamine, significantly lower levels of glutamate, and significantly higher ratio of glutamine/glutamate suggested that dietary supplementation of TAG may be used to protect against excitotoxicity associated with AD.

Example 2A—Effect of TAG on Glucose Metabolism in AD

TG2576 mice will be bred and housed in a dedicated, PC2-licensed animal house with a light-dark cycle of 12:12 h. Mice will be maintained ad libitum on standard mouse chow and potable water. The TG2576 strain is maintained on a B6/SJL background. Mice are genotyped by PCR of genomic DNA from skin samples. Housing and care of animals is in compliance with NSW DPI ARRP guidelines.

Powdered rat and mouse pellets (Specialty Feeds, Canningvale, WA) will be blended manually with TAG at 0.84% (w/w). Sterile deionized water will then be blended with the mixture at 10% w/w. The mash will be milled through a pellet press and the pellets baked for 2.5 h at 75° C. then stored dry at −20° C. prior to use.

Non-perfused brains will be obtained from euthanised animals by craniotomy. The brain will be bisected sagittally, one half was then fixed in 10% paraformaldehyde/PBS and the other stored frozen at −80° C.

Fresh weight of brains will be measured and the tissue homogenized in 10 volumes of extraction buffer (methanol: acetonitrile:water, 5:3:2) using an Omni TH02 homogenizer for 15 seconds on mid setting. Internal standard of 13C6 Glucose 6 phosphate will be added to each extract (620 ng in 50 µl buffer) prior to homogenization. The crude extract will be split to 2×1.5 ml labelled Eppendorf tubes then centrifuged (4° C.) at 16000 g for 15 min. The supernatants will be processed using 1 kDa centrifugal mwt cut-off filters (PALL Corp, MCP001C41) at 4000 rpm for 30 min. The low mwt fraction will be transferred to 2×1.5 ml labelled microcentrifuge tubes then evaporated to dryness under reduced pressure using a centrifugal evaporator (Savant SC110 coupled to a Dynavac FDA vapour trap and Edwards M5 vacuum pump). Samples will be stored at −20° C. One tube will be processed by solid phase extraction clean-up. SPE gives low recovery of analytes so the crude extracts will be analysed for most analytes. SPE processed samples will be used for measurement of UDP sugars because they give high signal in MSMS, so can be detected in SPE-treated samples. Extracts for UDP N-acetyl glucosamine and UDP N-acetyl galactosamine LC-MS/MS analysis will be purified by SPE as follows. Extracts will be re-solvated at 37° C. for 30 min by addition of 100 µl of acetonitrile/H$_2$O, 1:1 (v/v). 1 ml of 2% formic acid will then be added to each sample. SPE cartridges (3cc OASIS WAX, Waters) will be activated by loading 2 ml of methanol, followed by washing with 2 ml 2% formic acid. Extracts will be loaded, then washed with 2 ml 2% formic acid, followed by 2 ml of methanol. The acid fraction will be eluted with 2 ml of 5% ammonia in methanol. The eluates will be dried under reduce pressure and stored at −20° C. Other LC-MS/MS analysis will be carried out on extracts not processed by SPE.

For LC-MS, glucose 6 phosphate, fructose 6 phosphate, 6 phospho gluconic acid, ribulose 5 phosphate, xylulose 5 phosphate, ribose 5 phosphate, erythrose 4 phosphate, sedoheptulose 7 phosphate, glucosamine 6 phosphate, N-acetyl glucosamine 6 phosphate, UDP N-acetyl glucosamine and UDP N-acetyl galactosamine will be purchased form Sigma Aldrich. 13C6 glucose 6 phosphate (>99%) will be purchased from Cambridge isotope labs.

Levels of glucosamine 6 phosphate and fructose 6 phosphate may also be measured using commercially available fluorescence assay kits (Abcam).

Degassed and filtered mobile phase will be delivered isocratically or in a gradient at 1 ml/min by a Shimadzu SCL-10A system controller and LC-10AD Liquid chromatograph. Tubes containing 50% of the total hemi-brain extract will be re-dissolved in 50% acetonitrile water at 37° C. for 15 min. 40 µl of extract from 100 µl total volume will be added to 90 µl of mobile phase A and then injected into the 100 µl injection loop.

LC-MS of glucosamine 6 phosphate, erythrose 4 phosphate and fructose 1, 6 bisphosphate will be performed on mixed mode hydrophilic HPLC column 150 mm×4.6 mm id, with guard (Newcrom B, by SIELC) with a gradient of 20% MeCN/0.3% formic acid (A) for 10 min, then rising linearly over 1 min to 100% solvent B (10% MeCN 20 mM ammonium formate pH 3.3). Mobile phase will be maintained at 100% B for 4 min, then returned to 100% A over 1 min. Column will be reequilibrated for 10 min between samples. LCMS of Uridine diphosphate N-acetyl glucosamine and Uridine diphosphate N-acetyl galactosamine will be carried out on a mixed-mode HPLC column 150 mm×4.6 mm id, with guard (Primesep N, by SIELC) with isocratic 80% acetonitrile and 10 mM ammonium formate pH 4.3. LC-MS of glucose 6 phosphate, fructose 6 phosphate, 6 phosphogluconate, pentose 5 phosphate and sedoheptulose 7 phosphate will be carried out on the Newcrom B column with isocratic 20% acetonitrile and 0.3% formic acid.

HPLC column eluent will be split 5:1 and injected by ESI into a Thermo-Finnigan LCQ Deca mass spectrometer running in ESI-negative ion mode with MS/MS detection. MS/MS mode will be used to accumulate parent ions of specific mass/charge in the ion trap for reaction with the collision gas (He) to generate fragment ions used for the identification of analytes. For all analytes, with the exception of glucosamine 6 phosphate and fructose 1, 6 bisphosphate, the fragment ion to be used for identification is m/z 97 (phosphate) which is the most abundant ion. For Gln 6P the parent ion will be used, for F16 bp m/z 385 will be used.

Chromatograms will be analysed and analyte peak areas integrated using Xcalibur (version 2.0 SUR1). Peak integrals will be converted to nanomole amounts by regression analysis against high purity standards run under identical conditions. Nanomole amounts will be normalised by correcting for tissue fresh weight and recovery of internal standard 13C G6P. Group means and standard error (SE) and 1-tailed T-tests will be calculated using MS Excel software.

For RT-PCT analysis, brains will be thawed to 2-8° C., then homogenized in QIAZOL RNA-extraction solution (QIAGEN) using an Omni TH02 homogenizer. Total RNA will be extracted using RNeasy solid-phase cartridges (QIAGEN) with on-column DNase digestion. RNA will be quantified by absorbance at 260 nm and equal amounts of total RNA in all samples converted to cDNA using a commercial kit (RT2 First Strand kit, QIAGEN) and Rotorgene Q thermocycler (QIAGEN). Supplier-validated PCR assays, including primers and fluorescent probe will be purchased from IDT DNA. ddCT RT-PCR will be performed using 2 house-keeping genes. Triplicate PCR runs will be set up using a QIAgility (QIAGEN) robot to load reactions, and a Rotorgen Q for thermocycling. Changes in expression levels will be analysed by ddCT analysis, with 1-tailed t-tests used to compare the means of TAG and control diet.

For blood chemistry, whole core blood will be drawn from cardiac ventricle with an 18 gauge needle and added to heparin to prevent coagulation. Blood plasma will then be prepared by centrifugal removal of RBC and WBCs. Whole plasma will be stored frozen at −20° C. 50 µl whole plasma will be loaded into a blood chemistry analyser (Spotchem SP 443, Arkray) loaded with diagnostic strips (Arkray).

Peak integral areas will be converted to ×10$^6$, then regression analysis from standard curves used to convert peak integrals to nanomole amounts. Nanomole signals will be correction for volume injected. A conversion actor of 1/0.154=6.49 will be applied to give total nanomole analyte per hemi-brain. Whole extract amounts will be corrected for internal standard (IS) recovered (620 ng of 13C6G6P added per hemi-brain). The amount of 13C G6P nanomole/hemi-brain will be calculated by regression from the MSM signal (fragment m/z 97 from parent m/z 265) for 13C6 G6P. The ratio of added to recovered 13C6 G6P will be applied to the nanomole per hemi-brain value. These values will be normalised for variations in the amount of tissue extracted by dividing by the measured fresh weight of hemi-brain to give a nanomole/mg value for each analyte. One-tailed student's t-test will be applied to compare the means (n=5-6) grouped by genotype (WT vs TG2576) and experimental diet (control vs TAG).

It is anticipated that mice fed with TAG will have increased glucosamine 6 phosphate and glucose 6 phosphate. Fructose 6 phosphate is also expected to be increased in mice fed TAG, which can be explained by increased availability of glucose 6 phosphate. This reaction is catalyzed by the enzyme glucose phosphate isomerase (GPI). GPI is a "moonlighting" protein also which, when secreted acts as an extracellular cytokine known as neuroleukin and also autocrine motility factor (Haga 2000). GPI is neuroprotective (Knight et al. 2014, *Cell Metab.* 20 (1): 145-57), and its expression is down-regulated in Alzheimers brain tissue (Li et al. 2021, *Hereditas* 158 (1): 25) and increased in cerebrospinal fluid in AD (De Kort et al 2021, *Alzheimers Res Ther.* 13 (1): 160). There is a receptor for GPI called gp78/AMFR E3 ubiquitin ligase, which is a component of the endoplasmic reticulum degradation system which targets misfolded proteins and has been linked to some neurodegenerative disease (Huntington's, not AD). If GPI becomes deficient in AD due to diversion to its moonlighting neuroprotective role, then formation of fructose 6 phosphate for glycolysis would be reduced. The deficit of GPI could be rescued by increasing production of fructose 6 phosphate by administration of TAG.

Example 2B—Effect of Dietary TAG on UDP N-Acetyl Glucosamine in Brain Tissue of AD Mice Both EXT1 and uridine diphosphate N-acetyl glucosamine (UDP N-acetyl glucosamine) are required for synthesis of heparan sulfate, which is then converted to a highly sulfated form in AD brains. EXT1 is a transmembrane glycosyltransferase involved in the chain elongation step of heparan sulfate biosynthesis. It catalyses the glycosidic addition of N-acetyl glucosamine and glucuronic acid to the heparan sulfate chain (from UDP N-acetyl glucosamine).

UDP N-acetyl glucosamine is a biosynthetic precursor in the chain elongation reaction of heparan sulfate biosynthesis carried out by the heterodimeric enzyme EXT1/EXT2 (EC: 2.4.1.224, EC: 2.4.1.224):

UDP N-acetyl glucosamine+heparan sulfate<=>UDP+
(N-acetyl-D-glucosaminyl)-heparan sulfate The next step in chain elongation is the addition of glucuronic acid by EXT1/EXT2:

UDP-glucuronic acid+heparan sulfate<=>UDP+(glucuronyl)-heparan sulfate

UDP N-acetyl glucosamine is also an allosteric inhibitor of the enzyme glutamine fructose-6-phosphate transaminase, or GFAT (EC: 2.6.1.16) which catalyses the hexosamine pathway reaction:

fructose 6-phosphate+glutamine<=>glucosamine 6-phosphate+glutamate

Given the effect of TAG on plasma glutamate/glutamine levels in TG2576 AD mice (Example 1) and the role that UDP N-acetyl glucosamine plays in heparan sulfate chain modification in the brain (outlined above), the inventors sought to determine if UDP N-acetyl glucosamine levels may be effected by dietary supplementation with TAG.

To study the effect of TAG on UDP N-acetyl glucosamine levels, adult male and female TG2576 mice (>8 weeks old) were maintained on a control diet of standard chow (n=5) or batch-matched chow supplemented with 0.45% (w/w) TAG (n=5). After 6 weeks brains were excised and bisected in the sagittal plane. The hemi-brains were stored frozen (−80° C.) then thawed, weighed and homogenized in 10 volumes of MeOH/MeCN/H$_2$O (50%/30%/20%, v/v/v). Homogenates were centrifuged at 5000 rpm for 30 min. The supernatant was passed through 1 kDa MW centrifugal filters then evaporated and resuspended in the HPLC mobile phase. UDP N-acetyl glucosamine was run on a mixed-mode hydrophilic HPLC column (150 mm×4.6 mm id, Primesep N, by SIELC), with guard under a linear gradient of 80% acetonitrile and 10 mM ammonium formate pH 4.3 to 10% MeCN and 10 mM ammonium formate over 9 min, then return to starting conditions over 1 min. UDP N-acetyl glucosamine in brain extracts was quantified against commercial standard UDP N-acetyl glucosamine detected by mass spectrometry (MS-MS) in negative ion mode, scanning for m/z 606 and identification of major collision fragments m/z 385 and 403. UDP levels were corrected for brain mass. The effect of diet was calculated using 1-tailed t-test. A comparison between the levels of UDP N-acetyl glucosamine in brains of TG2576 mice fed a TAG-supplemented diet or a control chow diet after 6 weeks (age 21.2±1.5 wk at brain sampling) is represented in Table 2.

TABLE 2 levels of UDP N-acetyl glucosamine in brains of TG2576 mice after 6 weeks of TAG-supplemented diet.

| | Control diet (n = 5) | TAG diet (n = 5) | t-test (p-value) |
|---|---|---|---|
| UDP N-acetyl glucosamine (ng/mg brain fwt) | 20.2 ± 1.93 | 28.3 ± 2.13 | 0.037 |

After 6 weeks of TAG-supplemented diet, there was a 40% increase in levels of UDP N-acetyl glucosamine in TG2576 mouse brains. UDP N-acetyl glucosamine is an inhibitor of the enzyme GFAT, so the observed increase may account for the reduced glutamate plasma and increased glutamine/glutmate ratio, both of which are dependent on GFAT activity. UDP N-acetyl glucosamine is also a substrate required by EXT1/EXT2 for heparan sulfate chain elongation. Recent studies on EXT1/EXT2 activity and effects on chain modification suggest that increased UDP N-acetyl glucosamine in the brain may be related to altered sulfation patterns in brain heparan sulfate.

Heparan sulfate is known to co-deposit with Aβ plaques, bind to and accelerates Aβ aggregation, and mediates cytotoxicity, Aβ clearance, and neuroinflammation in vivo. The inventors proceeded to test if a diet supplemented with TAG, and potential effects on processing of heparan sulfate in the brain, may reduce memory deficits associated with AD.

Example 3A—Effect of Dietary TAG on Memory and Longevity in AD

The T-maze has been applied as a simple and sensitive assay of spatial working memory deficit in the TG2576 mouse (Lalonde et al. 2003, *Brain Res* 977 (1): 38-45; Stewart et al. 2011, *J Alzheimers Dis* 26 (1): 105-26). When a mouse is placed in the base of a T-maze it will move along the alley to the junction of left and right arms at the far end of the maze, at which point it is presented with a choice to move along either the left or right arm. If the same mouse is then immediately put back in the T-maze there is an innate tendency for the mouse to choose the opposite arm to that chosen previously. This tendency is called spontaneous alternation and has been interpreted as an exploratory behaviour used by mice to locate the presence of food, water, mates or shelter (Dember and Fowler 1958, *Psychological Bulletin* 55 (6), 412-428, Montgomery 1952, *Journal of Experimental Psychology* 42 (2), 82-93). The frequency of spontaneous alternation can be increased by use of food-deprived subjects and food rewards (Deacon & Rawlins 2006, *Nat Protoc* 1 (1): 7-12). During spontaneous alternation the mouse uses spatial working memory (Kraeuter et al. 2019, *Methods Mol Biol* 1916:105-111) to distinguish the unexplored path from the previously explored path. In these studies, the inventors have used the T-maze to measure the efficacy TAG of dietary supplements as potential treatments for AD.

As with previous examples, TG2576 mice were bred and housed in a dedicated, physical containment facility with a light-dark cycle of 12:12 h and maintained ad libitum on standard mouse chow or chow supplemented with TAG. Food rewards were 20 mg sucrose pellets (Fisher and Son, Somerville, NJ).

The T-maze is fabricated from MDF board, 200 mm high, and comprised of left and right arms (350×100 mm) and a start alley (300×100 mm). Removable partitions used as barriers are placed at 220 mm (start) or 260 mm (left and right) from the terminus of each arm. A central 70 mm riser is placed at the junction of the left and right arms to improve spatial recognition by subjects. The interior is painted black.

Male and female mice will be placed on an experimental diet of standard mouse chow (control) or batch-matched chow supplemented with TAG for various durations. The mean age of mice on the studies will be at least 5 months old. At this age spatial working memory deficits become apparent in TG2576 mice (Westerman et al. 2002, *J Neurosci* 22 (5): 1858-67; Arendash et al. 2004, *NeuroReport* 15:1751-1754).

The treatment groups will be TG2576 mice on control diet, WT on control diet, TG2576 on TAG diet and WT on TAG diet. Each treatment group will contain 10 mice at the start of experimental diet. Within each study mice will be assigned to give uniform age and gender across the treatment groups. Mice will be started on experimental diets at an average age of 11 weeks (range=4-35), and will be maintained on ad libitum diet prior to T-maze testing.

Prior to T-maze testing mice will be adapted to the maze for 4 days by allowing them to explore it for 5 min per day, with a few reward pellets scattered throughout. On the day prior to the T-maze testing mice will be given a short food ration of 2.5 g/d/mouse to improve T-maze performance (Corcoran et al. 2002, *Learn Mem* 9 (5): 243-252). Mice will be maintained on their treatment diet during T-maze testing. Each week of testing will comprise 4 consecutive days of T-maze testing then 3 rest days with no testing and ad libitum food. T-maze testing will be for 4 weeks duration (16 testing days).

On testing days each mouse will be run consecutively through 5 trials of the T-maze. Each trial comprises a blind run in which one access to one arm (L/R) of the T-maze will be blocked with a barrier, and a reward pellet placed in the unblocked arm. The blind run will be immediately followed by an open run with no barriers, where the food reward will be placed in the opposite arm to its position in the blind run. In this way the mice will be rewarded for alternation. The position of the pellet in right or left arms will be pseudo-randomised from one trial to the next.

Each run of the T-maze will be started by placing a mouse behind a partition at the base of the maze. The partition will then be removed allowing access to the maze. The trial will be scored as successful (score=1) if the subject located the reward during the open run of the trial. Movement up to 100 mm into the incorrect arm will be tolerated if the mouse reverted to the correct arm containing the reward. Mice will be allowed to navigate the maze for 1 min. If the subject is slow to move it will be gently prodded from behind to induce movement. Isopropanol (70% v/v) will be applied with lint-free wipes to clean and dry the maze between cages.

For each T-maze testing day, an alternation rate will be calculated for each mouse by converting from the number of correct L/R choices (raw data, range=0-5) to a percentage correct alternation (Lalonde et al. 2003, *Brain Res* 977 (1): 38-45) as shown in equation 1:

$$\text{Rate of alternation } (\%) = \frac{\text{number of correct } (L/R) \text{ choices} \times 100\%}{\text{Number of trials}}$$

For each treatment group the mean alternation rates (MAR) will be calculated at early, mid and late phases of T-maze testing, corresponding to days 1-5, 6-10 and 11-16 respectively. T-tests will be used to compare the mean alternation rates between the treatment groups.

During the course of the experiments, premature mortality of TG2576 hemizygotes is anticipated. To investigate the effect of dietary TAG, the mortality data of TG2576 mice fed either TAG or control diet mice will be pooled (4 cohorts, n=41) and graphed as a Kaplan-Meier plot. TG2576 APP males will also be bred with C57B/6 mothers as this pairing is reported to produce a higher mortality of progeny (Carlson 1997).

It is anticipated that TG2576 mice will obtain lower MAR than WT, which is consistent with previous findings (Hsiao et al. 1996, *Science* 274 (5284): 99-102; Chapman et al. 1999, *Nat Neurosci* 2 (3): 271-276; Corcoran et al. 2002, *Learn Mem* 9 (5): 243-252; Lalonde et al. 2003, *Brain Res* 977 (1): 38-45). A time-dependent increase in MAR values demonstrates that both hemizygous and wild type mice leant reward induced alternation in the T-maze.

Addition of TAG to the diet of TG2576 mice is anticipated to produce an increase in MAR values and survival.

Example 3B—Effect of Dietary TAG on Spatial Working Memory in AD

The T-maze was comprised of left and right arms (350× 100 mm) and a start alley (300×100 mm). Removable partitions used as barriers were placed at 220 mm (start) or 260 mm (left and right) from the terminus of each arm. A central 70 mm riser was placed at the junction of the left and right arms to improve spatial recognition by subjects.

Adult male and female mice (mean 14.3±0.84 weeks of age) were placed on an experimental diet of standard mouse chow (control) or batch-matched chow supplemented with TAG. The treatment groups reported here were TG2576 mice on control diet, wild type (WT) sibling mice on control diet, and TG2576 mice on a 0.45% (w/w) TAG-supplemented diet. Diets were given ad libitum prior to T-maze testing. Mice were maintained on their treatment diets during T-maze testing, supplied as a short food ration of 2.5 g/d/mouse (to improve T-maze performance) for 4 consecutive days during T-maze testing then, 3 rest days with no testing and food provided ad libitum.

The mean age of mice in the studies at the time of memory testing was 45±0.35 weeks. At this age, spatial working memory deficits become apparent in TG2576 mice. Prior to T-maze testing, mice were adapted to the maze for 4 days by allowing them to explore it for 5 min per day, with a few reward sucrose pellets scattered throughout. T-maze testing was for 4 weeks duration (16 testing days).

On testing days each mouse was run consecutively through 5 trials of the T-maze. Each trial comprises a blind run in which one access to one arm (L/R) of the T-maze was blocked with a barrier, and a reward pellet placed in the unblocked arm. The blind run was immediately followed by an open run with no barriers, where the food reward was placed in the opposite arm to its position in the blind run. In this way the mice were rewarded for alternation. The position of the pellet in right or left arms was pseudo-randomised from one trial to the next.

Each run of the T-maze was started by placing a mouse behind a partition at the base of the maze. The partition was then removed allowing access to the maze. The trial was scored as successful (score=1) if the subject located the reward during the open run of the trial. Movement up to 100 mm into the incorrect arm was be tolerated if the mouse reverted to the correct arm containing the reward. Mice were allowed to navigate the maze for 1 min. If the subject was slow to move it was gently prodded from behind to induce movement. Isopropanol (70% v/v) was applied with lint-free wipes to clean and dry the maze between cages.

For each T-maze testing day, an alternation rate was calculated for each mouse by converting from the number of correct L/R choices (raw data, range=0-5) to a percentage correct alternation (Lalonde et al. 2003, *Brain Res* 977 (1): 38-45) as shown in equation 1:

$$\text{Rate of alternation } (\%) = \frac{\text{number of correct } (L/R) \text{ choices} \times 100\%}{\text{Number of trials}}$$

The effects of genotype and TAG diet on T-maze performance were compared by the odds ratio. Results are expressed as odds ratios. An odds ratio (OR) is a measure of association between an exposure and an outcome. The OR represents the odds that an outcome will occur given a particular condition/exposure, compared to the odds of the outcome occurring in the absence of that condition/exposure. Increased odds are greater than one; decreased odds are less than one (e.g. OR=2 is twice the odds; OR=0.5 is half the odds). If the 95% CI does not include one, the odds are significantly different.

Using this model, the effect of genotype (WT vs TG2576) and diet (control vs TAG-supplemented), was measured on the T-maze score (0-5). The model was repeated for subsets of the timed data to allow for the learning curve of mice unfamiliar with the mazes.

TG2576 mice obtained lower MAR values than WT siblings, which is consistent with previous findings. Addition of TAG to the diet of TG2576 mice produced a marked and significant increase in MAR values after 16 days, as represented in Table 3.

TABLE 3

T-maze results after 16 days

| Treatment (n) | MAR ± SE | Odds Ratio (95% CI) | p-value |
|---|---|---|---|
| TG2576- control (7) | 67.8 ± 2.8 | 0.18 vs WT (0.09, 0.36) | <0.001 |
| WT- control diet (8) | 79.4 ± 2.8 | n/a | n/a |
| TG2576- TAG diet (8) | 74.6 ± 2.4 | 2.29 vs TG2576 control (1.16, 4.50) | 0.017 |

Table 3 shows the effect of TAG diet on spatial working memory as measured using the alternating T-maze with odds ratios, 95% confidence intervals (CI) and statistical analysis. The results show a significant (p=0.017) beneficial effect of a diet supplemented with 0.45% (w/w) TAG on memory deficits in a TG2576 model of AD.

The Morris water maze (MWM) has been used to measure spatial memory deficit in TG2576 mice. Mice are placed in a tub of water and containing a submerged platform. The amount of time required for a mouse to swim to the platform is referred to as the maze "escape time". There are two testing stages in the water maze: 1. VISIBLE STAGE, in which the position of the platform is made visible by a marker pole attached to the platform, and 2. HIDDEN STAGE where the marker pole is removed and the water made opaque by the addition of white paint. Compared to wild type siblings, older TG2576 mice show increased latency to escape time.

The maze consisted of a 715 mm diameter tub filled to a depth of 70 mm. For VISIBLE STAGE testing, mice were placed in the water maze and the time they took to reach the platform was recorded with a stop watch. This testing was carried out 8 times per day for 3 days, during which the platform was moved to various positions around the maze. The walls of the maze were inscribed with 4 distinct shapes that were provided as spatial cues for learning. The HIDDEN STAGE testing was carried out for 7 days, 4 times per day. The position of the platform was fixed, but mice were placed in the maze at different positions for each test.

The effects of genotype and TAG diet on performance in the Morris water maze were compared. Results are expressed as odds ratios. An odds ratio (OR) is a measure of association between an exposure and an outcome. The OR represents the odds that an outcome will occur given a particular condition/exposure, compared to the odds of the outcome occurring in the absence of that condition/exposure. Increased odds are greater than one; decreased odds are less than one (e.g. OR=2 is twice the odds; OR=0.5 is half the odds) If the 95% CI does not include one, the odds are significantly different.

Using this model, the effect of genotype (WT vs TG2576) and diet (control vs TAG-supplemented), on the water maze escape times was measured from days 2-7. The model was repeated for subsets of the timed data to allow for the learning time of mice that were unfamiliar with the mazes. As subjects learned to navigate and find the hidden platform, their escape time was reduced. Thus, escape time is inversely correlated with memory function in the water maze.

Addition of TAG to the diet of TG2576 mice decreased the latency to escape time after 7 days, as represented in Table 4.

TABLE 4

Water maze results after 7 days

| Treatment (n) | Mean escape time ± SE | Odds Ratio (95% CI) | p-value |
|---|---|---|---|
| TG2576- control (7) | 11.4 ± 0.83 | 3.3 vs WT (1.2, 8.5) | 0.015 |
| WT- control diet (8) | 7.73 ± 0.57 | n/a | n/a |
| TG2576- TAG diet (8) | 9.31 ± 0.80 | 0.36 (0.13, 0.94) | 0.037 |

Similar to the T-maze, TAG-supplemented diet also significantly improved (p=0.037) spatial working memory as measured using the Morris water maze in a TG2576 mouse model of AD. Together, these results confirm that TAG supplementation in diet has significant benefits for memory function.

The invention claimed is:

1. A method of treating Alzheimer's disease (AD) in a subject, comprising administering to the subject O-acetyl glucosamine or a salt or hydrate thereof, wherein the O-acetyl glucosamine has the following structure

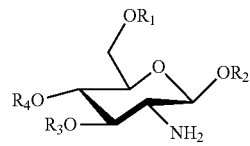

and wherein R1, R2, R3 and R4 are all acetyl.

2. A method of treating preclinical AD or preventing AD or preventing preclinical AD in a subject, comprising administering to the subject O-acetyl glucosamine, wherein the O-acetyl glucosamine has the following structure

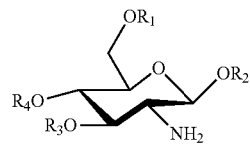

and wherein R1, R2, R3 and R4 are all acetyl.

3. The method of claim 2, wherein the method is a method of prevention and the subject is identified as at risk of AD or preclinical AD.

4. The method according to claim 1, wherein the subject is administered a pharmaceutical composition comprising the O-acetyl glucosamine, salt or hydrate and at least one pharmaceutically acceptable excipient.

5. The method according to claim 1, wherein the O-acetyl glucosamine, salt, or hydrate is administered to the subject by a route selected from orally, nasally, buccally, sublingually, intravenously, transmucosally, parenterally, by inhalation, spray, transdermally, subcutaneously, intrathecally, topically and rectally.

6. The method according to claim 1, wherein the O-acetyl glucosamine, salt, or hydrate is administered to the subject orally.

7. The method according to claim 1, wherein the method decreases expression of exostosin glycosyltransferase 1 (EXT1) in the brain of the subject, or the method increases expression of UDP N-acetyl glucosamine expression in the brain of the subject, or the method reduces levels of highly sulfated heparan sulfate in the brain of the subject, or the method increases glucose 6 phosphate in the brain of the subject.

8. The method according to claim 1, wherein the AD is selected from early-onset AD, late-onset AD and the Uppsala APP deletion form of AD.

9. The method according to claim 1, wherein the method increases levels of glucosamine 6 phosphate in the brain of the subject.

10. The method according to claim 1, wherein the method increases levels of fructose 6 phosphate in the brain of the subject.

11. The method according to claim 1, wherein the method reduces seizure associated death in the subject.

12. The method according to claim 1, wherein the method reduces spatial working memory deficit in the subject.

13. A kit including:
a container holding an O-acetyl glucosamine, a salt, hydrate, or pharmaceutical composition thereof;
a label or package insert with instructions for use in treating AD in a subject, wherein the O-acetyl glucosamine has the following structure

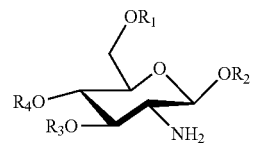

and wherein R1, R2, R3 and R4 are all acetyl.

14. The method according to claim 4, wherein the pharmaceutical composition is administered to the subject by a route selected from orally, nasally, buccally, sublingually, intravenously, transmucosally, parenterally, by inhalation, spray, transdermally, subcutaneously, intrathecally, topically and rectally.

15. The method according to claim 4, wherein the pharmaceutical composition is administered to the subject orally.

* * * * *